June 14, 1927. 1,632,717

O. STUMPF

POCKET STAND

Filed June 21, 1926

Inventor:
Otto Stumpf

Patented June 14, 1927.

1,632,717

UNITED STATES PATENT OFFICE.

OTTO STUMPF, OF MANNHEIM, GERMANY.

POCKET STAND.

Application filed June 21, 1926, Serial No. 117,520, and in Germany May 20, 1926.

This invention relates to a pocket stand for cameras and the like which, after having been collapsed, is folded flat so that it can be easily carried in a pocket or knapsack. The stand unfolded is of the normal size. The feet after having been telescoped are, according to the invention, folded over in upward direction so that they are parallel with the two outer supports on the supporting plate for the camera, said supports being also adapted to be telescoped. For use, the feet have to be lowered and extended and locked in this position whereupon the camera supports are extended also and the camera is screwed on.

An embodiment of the invention is shown, by way of example, in the accompanying drawing, in which.

Figure 2:
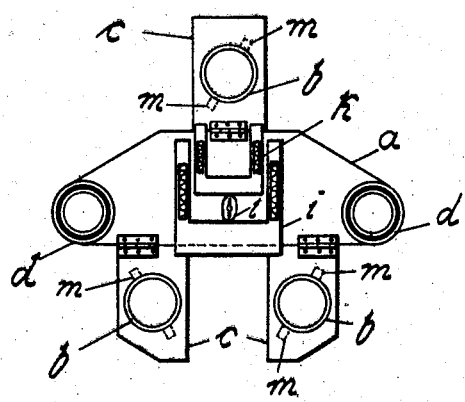
Fig. 2 is a top plan view of Fig. 1 the camera support plate being removed.
Figure 1:
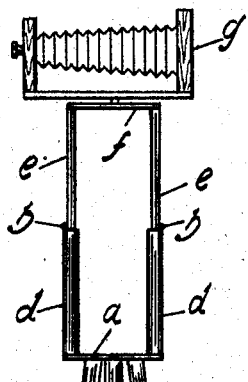
Fig. 1 shows in side elevation the stand ready for use.
Figure 3:
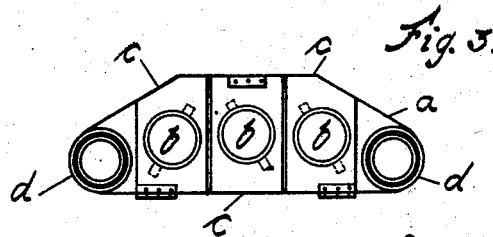
Fig. 3 is a similar top plan view the base plate of the camera support being also removed.
Figure 4:
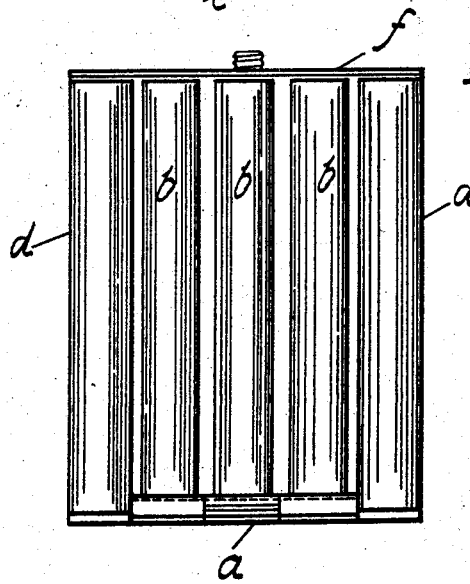
Fig. 4 shows in side elevation the collapsed stand.

On the lower surface of the base plate $a$ of the camera support the legs $b$ are hingedly fixed by means of flaps $c$, these flaps being designed to be laid over onto the base plate $a$ when the legs $b$ have been telescoped. On two opposite sides of the base plate $a$ two tubes $d$ are arranged into which tubes $e$ are telescoped which carry at the top ends the supporting plate $f$ for the camera $g$, springs $h$ serving for securing the tubes $e$ in the extended position.

If the stand is in the position for use the flaps $c$ are secured in the laid down position by means of locking elements $i$, $k$ slidably mounted on the base plate $a$, an oval rotatable element $l$ on said base plate $a$ between said locking elements $i$, $k$ serving to shift these locking elements in outward direction so that they grip over the flaps $c$ or to release said flaps so that they can be pulled back by the action of springs $l$.

Studs $m$ laterally projecting from the upper end of each leg $b$ and guided in recesses of the bed plate serve to lock the legs in the inclined position. The elements of the legs are securely held in the extended position by the action of locking springs not shown.

I claim:—

1. A folding pocket stand comprising in combination three legs composed each of several telescoped elements, a support for the camera consisting of a base plate, of extensible tubular supports and of a supporting plate for the camera fixed on the top ends of said tubular supports, flaps hingedly fixed on said base plate, one for each leg, the top ends of said legs being mounted in said flaps, two shiftable spring-controlled locking elements on said base plate, and an oval element pivotally mounted on said base plate between said locking elements to push the same over the raised flaps or to liberate said flaps according to its position.

2. A folding pocket stand comprising in combination three legs composed each of several telescoped elements, a support for the camera consisting of a base plate, of extensible tubular supports having springs for securing the elements of said tubular supports in the extended position and of a supporting plate for the camera fixed on the top ends of said tubular supports, flaps hingedly fixed on said base plate, one for each leg the top ends of said legs being adjustably mounted in said flaps, two shiftable spring-controlled locking elements on said base plate, and an oval element pivotally mounted on said base plate between said locking elements to push the same over the raised flaps or to liberate said flaps according to its position.

3. A folding pocket stand comprising in combination three legs composed each of several telescoped elements, a support for the camera consisting of a base plate, having three times two opposite recesses, of extensible tubular supports and of a supporting plate for the camera fixed on the top ends of said tubular supports, flaps hingedly fixed on said base plate, one for each leg the top ends of said legs being adjustably mounted in said flaps, two shiftable spring-controlled locking elements on said base plate, an oval element pivotally mounted on said base plate between said locking elements to push the same over the raised flaps or to liberate said flaps according to its position, and two laterally projecting extensions at the upper end of each leg engaging with said recesses of the bed plate and designed to secure the legs in the inclined position.

In testimony whereof I affix my signature.

OTTO STUMPF.